US007893816B1

(12) United States Patent
Kwan

(10) Patent No.: US 7,893,816 B1
(45) Date of Patent: Feb. 22, 2011

(54) HIGH SENSITIVITY RADIO FREQUENCY IDENTIFICATION TAG

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 1505 days.

(21) Appl. No.: 11/009,677

(22) Filed: Dec. 10, 2004

(51) Int. Cl.
    *H04Q 9/00* (2006.01)
(52) U.S. Cl. .................................. 340/10.34
(58) Field of Classification Search ............. 340/10.34, 340/10.1, 572.1, 7.32; 455/343.1
    See application file for complete search history.

(56) References Cited

U.S. PATENT DOCUMENTS

| | | | | |
|---|---|---|---|---|
| 4,818,855 A | * | 4/1989 | Mongeon et al. | 235/440 |
| 5,300,875 A | * | 4/1994 | Tuttle | 320/138 |
| 5,430,441 A | * | 7/1995 | Bickley et al. | 340/10.2 |
| 5,686,902 A | * | 11/1997 | Reis et al. | 340/10.2 |
| 5,826,175 A | * | 10/1998 | Schmidt et al. | 455/77 |
| 6,614,392 B2 | * | 9/2003 | Howard | 342/357.07 |
| 6,700,491 B2 | * | 3/2004 | Shafer | 340/572.7 |
| 2002/0149483 A1 | * | 10/2002 | Shanks et al. | 340/572.1 |
| 2003/0067382 A1 | * | 4/2003 | Spiess et al. | 340/7.32 |

OTHER PUBLICATIONS

PowerID, "Powerful, reliable asset visibility", Power Paper, Sep. 2004.
PowerID, Power, reliable RFID solutions, Power Paper, Nov. 2004.

* cited by examiner

*Primary Examiner*—Edwin C Holloway, III
(74) *Attorney, Agent, or Firm*—Peter Priest; Paul Martin

(57) ABSTRACT

Systems and techniques for identification of items using radiofrequency identification (RFID) tags exhibiting a high sensitivity to signals such as signals emitted by an RFID reader. An RFID tag includes an amplification circuit operative to detect and amplify a signal received from an RFID reader, in order to allow for processing of and response to the signal. The amplification circuit may be powered by a battery, suitably a flexible printable battery. Alternative or additional power sources may be used, such as a solar cell or a magnetic coupling, and depending on the design and operation of the tag, these power sources may be used instead of the battery or to recharge the battery if required.

16 Claims, 5 Drawing Sheets

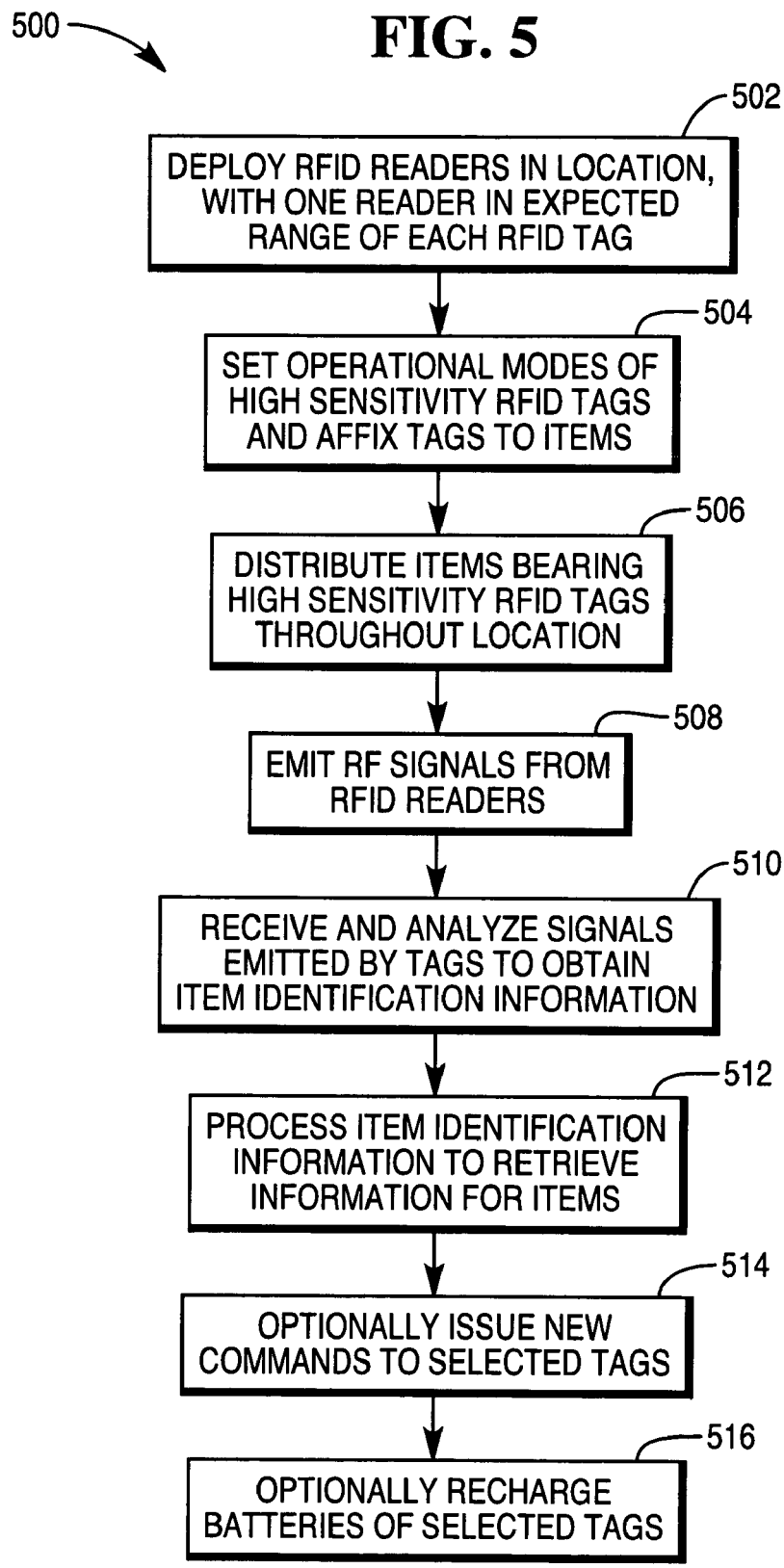

HIGH SENSITIVITY RADIO FREQUENCY IDENTIFICATION TAG

FIELD OF THE INVENTION

The present invention relates generally to improvements to radio frequency identification (RFID) systems used for control of goods. More particularly, the invention relates to systems and techniques for RFID tags having a relatively high sensitivity to radiofrequency (RF) energy used to communicate with the tags.

BACKGROUND OF THE INVENTION

Radio frequency identification (RFID) systems offer the possibility of inexpensive and efficient management of goods, with applications in inventory control and retail checkout, for example. Each item in an inventory of items, for example in a retail store or a warehouse, may be equipped with an RFID tag, that is, a tag containing an RFID device. The RFID device emits a signal that supplies information about the product to an RFID reader. The information may include product identification, such as manufacturer and item identifiers, such as those provided by a standard universal product code (UPC) bar code. The information may also include a unique serial number, so that each individual item may be easily identified by a reader. Typical RFID readers broadcast a radiofrequency (RF) signal. Tags within the range of the reader return a signal to the reader, frequently in the form of modulated backscatter of the signal emitted by the reader. RFID tags are preferably small and inexpensive. A small size allows for a tag to be placed on a small item. A low cost allows a tag to be placed on each item in an inventory at a reasonable overall cost. Producing small, low cost tags imposes constraints on the design of the tags. One effect of these constraints is that conventional RFID tags, particularly passive tags, tend to have relatively limited sensitivity. That is to say, conventional RFID tags must receive a relatively strong signal from the reader in order to receive power from and communicate with the reader. A conventional tag's need for a relatively strong signal limits the distance from an RFID reader at which the tag can operate. Many typical prior art passive tags can respond to a typical RFID reader from a range of approximately three feet.

In addition to having a relatively limited sensitivity even under ideal conditions, a typical prior art passive tag is sensitive to conditions that interfere with the reception of RF energy by the tag. For example, if a tag is placed on or near a product with high water content, such as on a soft drink container or a gallon of milk, the water in the product tends to absorb a significant portion of any RF energy reaching the product. Relatively little RF energy is available to power and communicate with the tag. Similarly, if an RFID tag is placed on metal container packaging a product, much of the RF energy coming from an RFID reader will be reflected away from the tag by the metal container, reducing the amount of RF energy available to the tag.

In many applications, it is desirable that every RFID tag be within range of at least one RFID reader deployed in a location. For example, the stock of a retail store may be arranged on shelves throughout the store, with a number of RFID readers deployed throughout the store. Conventional tags must typically be placed within relatively short distances from an RFID reader, requiring that a sufficiently large number of readers be deployed so that each tag is a relatively short distance from at least one reader.

Deploying a large number of readers leads to significant expense, for example the cost of the readers and the cost of wiring for the readers. In addition, the use of a large number of wired readers requires rerouting of a large amount of wiring for the readers whenever the location is remodeled. Further, the use of a large number of readers increases the probability that at least one reader will fail and therefore increases the cost of maintaining the reader system due to the frequent need for repair and replacement of readers.

There exists, therefore, a need for an RFID tag having a relatively high sensitivity to RF energy emitted by an RFID reader.

SUMMARY OF THE INVENTION

An RFID tag according to an aspect of the present invention includes an antenna used in communicating with a reader, and an RFID circuit for receiving and processing signals received from the antenna and preparing signals to be transmitted to the reader. The RFID circuit is preferably in the form of an integrated circuit, suitably an application specific integrated circuit (ASIC). The RFID circuit preferably includes a processing circuit and an amplification circuit. The amplification circuit is able to receive power generated independently of any signal received from the reader, for example from an onboard battery or from an interface to an external power source. If an interface to an external power source is used, power obtained through this interface to the external power source can be used to directly power the amplification circuit, to recharge the battery, or both.

The amplification circuit receives signals from the antenna, amplifies the signals, and provides the amplified signals to the processing circuit. Amplifying the signal from the RFID reader helps to insure that even a relatively weak signal can be detected and processed by the RFID tag. The amplification circuit may have a number of different modes of operation. For example, the amplification circuit may be active only when an RFID signal is detected that is too weak to process without amplification. In other exemplary alternatives, the amplification circuit may be active whenever an RFID signal is detected, may be active at all times, or may be active at prescribed time intervals. The amplification circuit suitably includes or communicates with an amplifier control that can be set so that the amplification circuit operates in a desired mode.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates a process of management and control of goods according to an aspect of the present invention.

DETAILED DESCRIPTION

Figure 1:
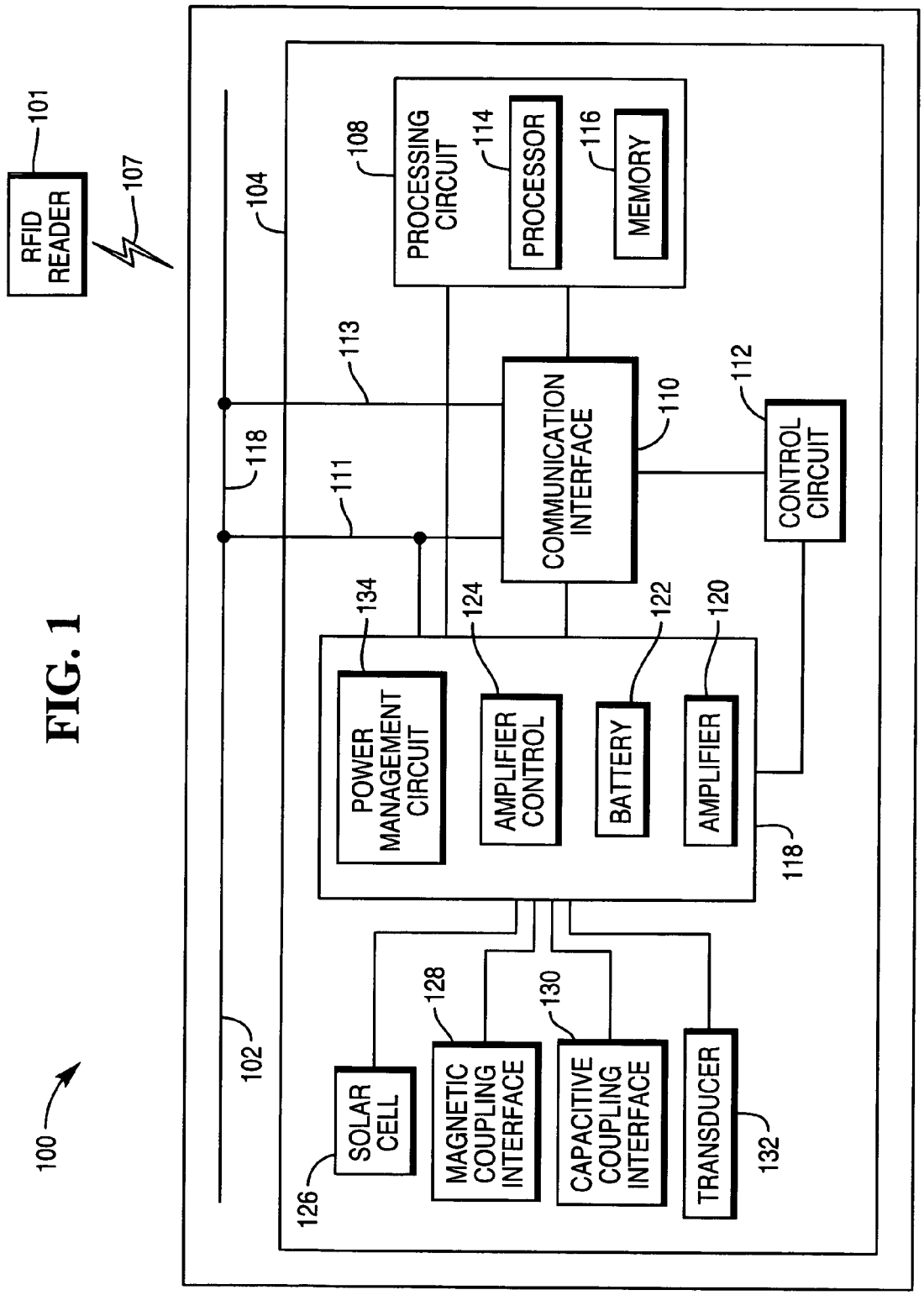
FIG. 1 illustrates an RFID tag according to an aspect of the present invention.

FIG. 1 illustrates an RFID tag 100 and an RFID reader 101 according to an aspect of the present invention. The tag 100 includes an antenna 102 and an RFID circuit 104. The RFID tag 100 communicates with the RFID reader 101 employing an emitted RF signal 107. Only a single RFID reader 101 is illustrated in FIG. 1, but it will be recognized that an installation will typically include numerous RFID readers and that the tag 100 may be used with any appropriately designed reader.

The RFID circuit 104 is preferably in the form of an integrated circuit (IC), which may suitably be an application specific integrated circuit (ASIC). The RFID circuit 104 includes a processing circuit 108, a communication interface 110 and a control circuit 112. The processing circuit 108 includes a processor 114 and memory 116. The communication interface 110 receives compatible signals, such as a signal originating at the RFID reader 101, and supplies the signals to the processing circuit 108, which processes the signals to interpret commands and other information represented by the signals. The processing circuit 108 also prepares an appropriate response to signals received from the RFID reader 101, which is transmitted to the reader 101 using the communication interface 110.

Typically, the RFID 101 reader transmits an interrogation signal and the RFID tag 100 responds to the interrogation signal by transmitting identification information. The identification information may simply be an identification code associated with the tag 100, or may include additional information. The additional information may include a product identifier such as a universal product code, and may alternatively or in addition include any other desired information, such identification, inventory control, descriptive, or pricing information.

The various components of the tag 100 suitably receive power from the signals that are received through the antenna 102. In some cases, for example, if an RFID reader is relatively far away from the tag 100, or if the tag is near an object or material that tends to absorb or deflect RF energy, such as liquid or metal, the power provided by the signal will be insufficient to power the processing circuit 108. In addition, the signal will be too weak to be properly interpreted by the processing circuit 108. Therefore, the tag 100 includes an amplification circuit 118 that is able to receive and amplify the signal received from the antenna 102, and then to furnish the amplified signal to the communication interface 110. The amplification circuit 118 can also provide power to the processing circuit 108, communication interface 110 and control circuit 112. The amplification circuit suitably is suitably capable of receiving power from a source independent of an interrogation signal or other signal from the RFID reader that is to be received and interpreted by the RFID tag 100. In one alternative, the amplification circuit 118 may suitably include an amplifier 120, a battery 122 and an amplifier control circuit 124. The amplifier 120 uses power from the battery 122 to amplify the signal received from the reader 101, and the amplifier control circuit 124 controls the operation of the amplification circuit 118 in order to achieve a desired mode of operation.

The battery 122 is preferably flexible, and may suitably be a flexible printable battery. Advantageously, the battery 122 may be an integrated circuit element incorporated into the overall design of the amplification circuit 118, which may in turn be an integrated circuit element incorporated into the design of the RFID circuit 104. Preferably, the tag 100 is flexible in order to provide for versatility in affixing the tag 100 to products of varied sizes and shapes, and implementing the battery 122 in the form of a flexible printable battery allows for flexibility in the tag 100, as well as a low cost for the battery 122. In addition, implementing the battery 122 as a flexible printable battery allows for the tag 100 to be very thin, providing for increased convenience and versatility in affixing the tag 100 to items.

The battery 122 is shown here as a separate element for clarity of illustration, but may be incorporated into other elements of the tag 100. For example, one particularly advantageous way to implement the battery 122 is as an element of the antenna 102. The antenna 102 and the battery 122 may be implemented as a single printable structure, providing for improved production efficiency and thus a lower overall cost as compared to implementing the antenna 102 and the battery 122 as two separate structures.

Many different alternative modes of operation for the amplification circuit 118 are available, depending on the specific design and settings of the RFID tag 100. In one alternative, the amplification circuit 118 is active only if a signal is detected but the level of the signal is below a predetermined minimum. Such a design allows for reception and processing of the unamplified signal if the signal is strong enough so that no amplification is required, at a significant savings of power.

In another alternative, the amplification circuit 118 is active whenever a signal is received. In another alternative, the amplification circuit 118 is always active. A variety of other alternatives may be envisioned, for example activation of the amplification circuit at predefined intervals, such as every second or every 10 seconds. Suitably, the antenna 102 is connected by leads 111 and 113 to the communication interface 110, which is in turn connected to the processing circuit 108 and the control circuit 112, in order to allow for operation of these circuits by unamplified power received from the antenna. In addition, the antenna 102 is connected to the amplification circuit 118, which is in turn connected to the other components in order to provide amplified signals and power if needed.

Depending on commands received from an appropriate device such as an RFID reader similar to the reader 101, or a dedicated programming device, the control circuit 112 makes appropriate settings for the tag 100. The control circuit 112 may suitably issue commands to the amplifier control circuit 124 in order to make settings to choose a mode of operation governing the response of the amplification circuit 118 to detection of signals from a reader such as the reader 101. For example, a mode of operation may be set to determine whether amplification is to be performed at all times, upon reception of a signal of any strength, or upon reception of a detectable but weak signal. Depending on the design of the tag 100, the settings may be permanent once made, or may be changeable on command. As a further alternative, the operation of the amplification circuit 118 may be initially set to a default state and then may be able to be changed to another state upon a command. The new state may be permanent, or the operation may be changed to the default state or a different state upon a command, or may revert to the default state after passage of a predetermined time. It will also be recognized that numerous other alternatives exist and that the tag 100 does not need to be designed so that performance characteristics are set by commands. For example, permanent performance characteristics may be incorporated into the design of the tag 100.

A number of alternative power sources may be used for the amplification circuit 118, instead of or in addition to the battery 122, and a tag such as the tag 100 may incorporate interfaces or coupling devices in order to take advantage of these power sources. Examples of such interfaces and coupling devices may include a solar cell 126 to generate photoelectric energy, a magnetic coupling interface 128 to allow for coupling to an external magnetic field or a capacitive coupling interface 130 to allow for coupling to an external electrical field, or any of a number of other devices for receiving energy from external sources. The solar cell 126 may be in the form of a printable solar cell, allowing for flexibility and thinness. The capacitive coupling interface 130 may be in the form of a printable super capacitor. The magnetic coupling interface 128 may be in the form of an antenna structure. As an alternative or in addition to the magnetic coupling interface 128, the antenna 102 may be designed so as to allow it to serve as an interface for magnetic coupling. If the tag 100 communicates at 900 MHz, the design of the antenna 102 will typically be such that it can also be used to receive energy through magnetic coupling at fields exhibiting frequencies of 125 kHz, 13.56 MHz or 400 MHz.

Additional possible energy sources that may be used include ultrasonic energy, or mechanical energy from motion or vibrations. Such ultrasonic or mechanical energy may be converted to electricity through the use of a transducer 132.

The amplification circuit 118 may include a power management circuit 134, allowing conversion of power received from the various interface devices 126, 128, 130 or 132 or the antenna 102 to a form used by the amplification circuit 118. For example, if the magnetic coupling interface 128 or the antenna 102 delivers AC power and the amplification circuit uses DC power, the power management circuit 134 may perform AC to DC conversion.

If desired, the battery 122 may be rechargeable. Such an implementation is likely to extend the life of the battery 122, because the battery 122 would be able to be fully or partially recharged whenever the tag 100 is within range of a suitably energy source, and energy sources that are only available at unpredictable intervals could be advantageously used to generate power for recharging the battery 122, even if those energy sources could not be relied on as a sole source of power for the amplification circuit 118. For example, the transducer 132 may advantageously be used to provide power for recharging the battery 122, even if the mechanical motion on which the transducer 132 depended for energy is only available sporadically.

In addition, if the antenna 102 is used as an interface to an external power source, power may be obtained from the RFID signal 107 emitted by the reader 101. In many cases, an RFID signal may be received that is strong enough to power communication by the tag 100 without a need for amplification by the amplification circuit 118. The RFID signal 107 may in many cases be strong enough not only to provide power for communication but to supply additional power that can be used to charge the battery 122. In addition, the RFID signal 107 may be available and sufficient to provide power at times when the tag 100 does not need to communicate with the reader 101. For example, the tag 100 may be set to respond to an RFID signal at intervals, but the RFID signal 107 may be present and able to provide power between those intervals. The power from the RFID signal 107 can be used to charge the battery 122 during those times. The amplification circuit 118 can be designed so that power from an interface to an external power source, such as the interfaces 126, 128, 130 and 132, or the antenna 102, is provided to the power management circuit 134, where it can be adapted and conditioned as needed and put to whatever use is appropriate, such as providing power for amplification or for charging the battery 122.

Depending on the operational mode of the amplification circuit 118, a battery such as the battery 122 may have a long, or a very long, life span. The amplification provided by the amplification circuit 118 requires relatively little power, such that a small battery, for example a very small 16 milliamp-hour battery would support a tag such as the tag 100 for one year. If the amplifier control 124 is set so that the amplification circuit 118 operates only intermittently, for example only at specified intervals or only when an RFID signal is detected that is too weak to properly receive and process without amplification, the same small battery may support the tag for several years.

While a system including tags according to the present invention is shown for illustration purposes, it will be recognized that tags in accordance with the invention may be mixed with prior art tags as desired. To take a simple example, a very low cost prior art tag may be affixed to each product on a pallet of products, while a tag according to the present invention may be affixed to the pallet.

Figure 2:
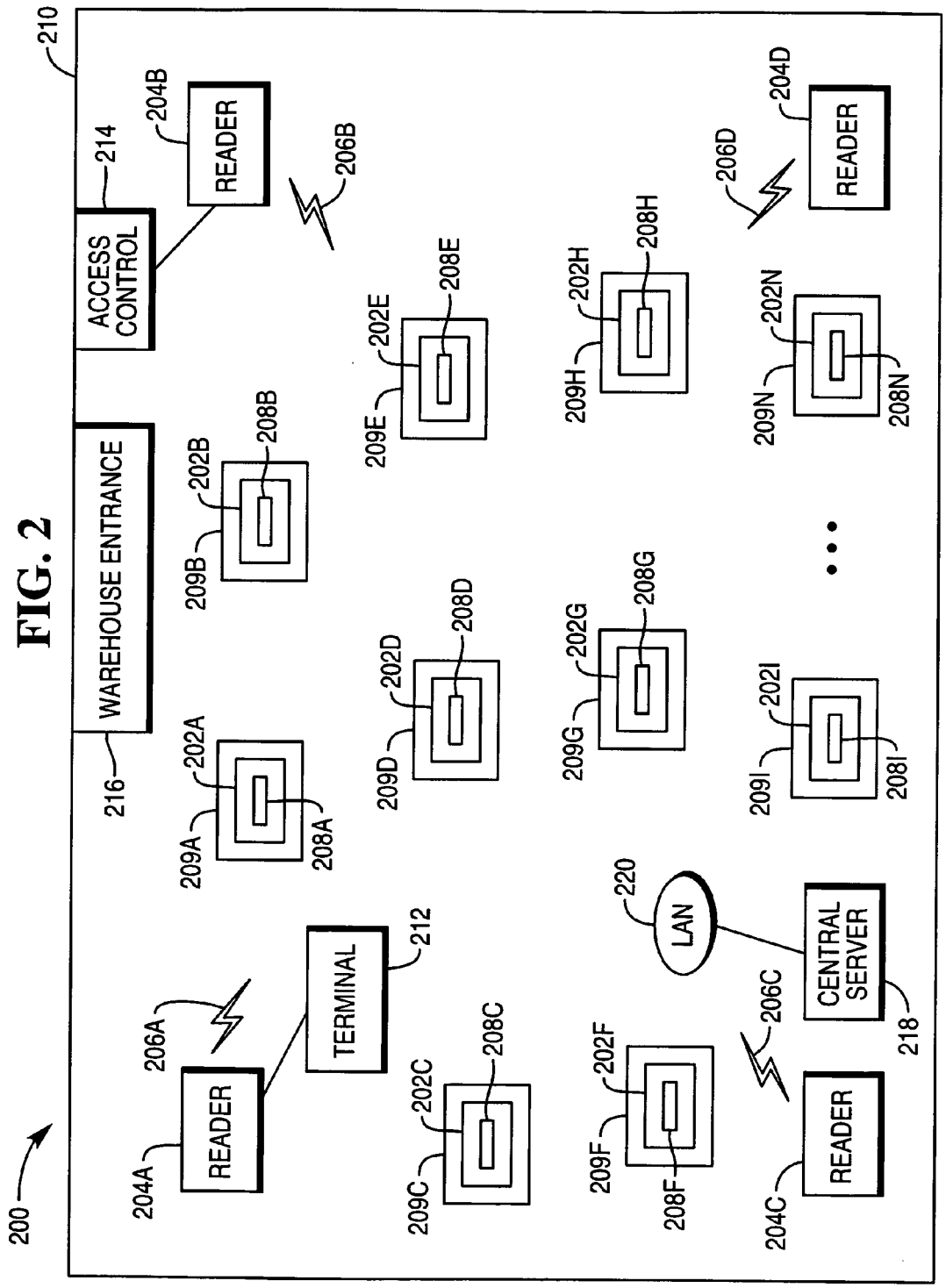
FIG. 2 illustrates an RFID system according to an aspect of the present invention.

FIG. 2 illustrates a system 200 for monitoring of products according to an aspect of the present invention. The system 200 includes a plurality of RFID ID tags 202A, 202B, 202C, 202D, . . . , 202N, as well as a plurality of RFID readers 204A-204D. Only four RFID readers 204A-204D are illustrated here, but it will be recognized that a system such as the system 200 may include any desired number of RFID readers to suit a particular application and typically will include a large number of readers. The RFID readers 204A-204D emit RF signals 206A-206D, respectively. Each of the tags 202A, . . . , 202N is a high sensitivity tag similar to the tag 100 of FIG. 1. Each tag includes an amplification circuit 208A, . . . , 208N, respectively, so that the tag can detect and respond to even a relatively weak signal from the reader.

The use of the amplification circuits 208A, . . . , 208N gives the tags a significantly greater range, compared to prior art tags. Each of the tags 202A, . . . , 202N may be expected to have a range from 8 to 16 times that of a prior art tag similar in overall design but without an amplification circuit such as the circuits 208A, . . . , 208N. The tags 202A, . . . , 202N are affixed to items 209A, . . . , 209N, respectively, and the items 209A, . . . , 209N are distributed throughout a retail location 210, such as a store or warehouse. The readers 204A-204D are deployed so that each of the tags 202A, . . . , 202N will be within range of at least one of the readers 204A-204D. Because of the relatively high sensitivity of the tags 202A, . . . , 202N, the readers 204A-204D can be deployed such that a reader can be up to 48 feet from the nearest other reader, while still insuring that each of the tags 202A, . . . , 202N will be within range of at least one of the readers 204A-204D. Each of the readers 204A-204D suitably communicates with a device that receives information from and transmits commands and information to the reader. For example, the reader 204A may communicate with a terminal 212 and the reader 204B may communicate with an access control device 214, with the access control device monitoring and exercising control over a warehouse entrance 216. All of the readers 204A-204D may suitably communicate with a central server 218. Such communication may be done over a wired connection with the server 218, wirelessly, or through a combination of wired and wireless communication. The central server 218 may be connected to a local area network 220, providing a gateway to other servers and devices.

Figure 3:
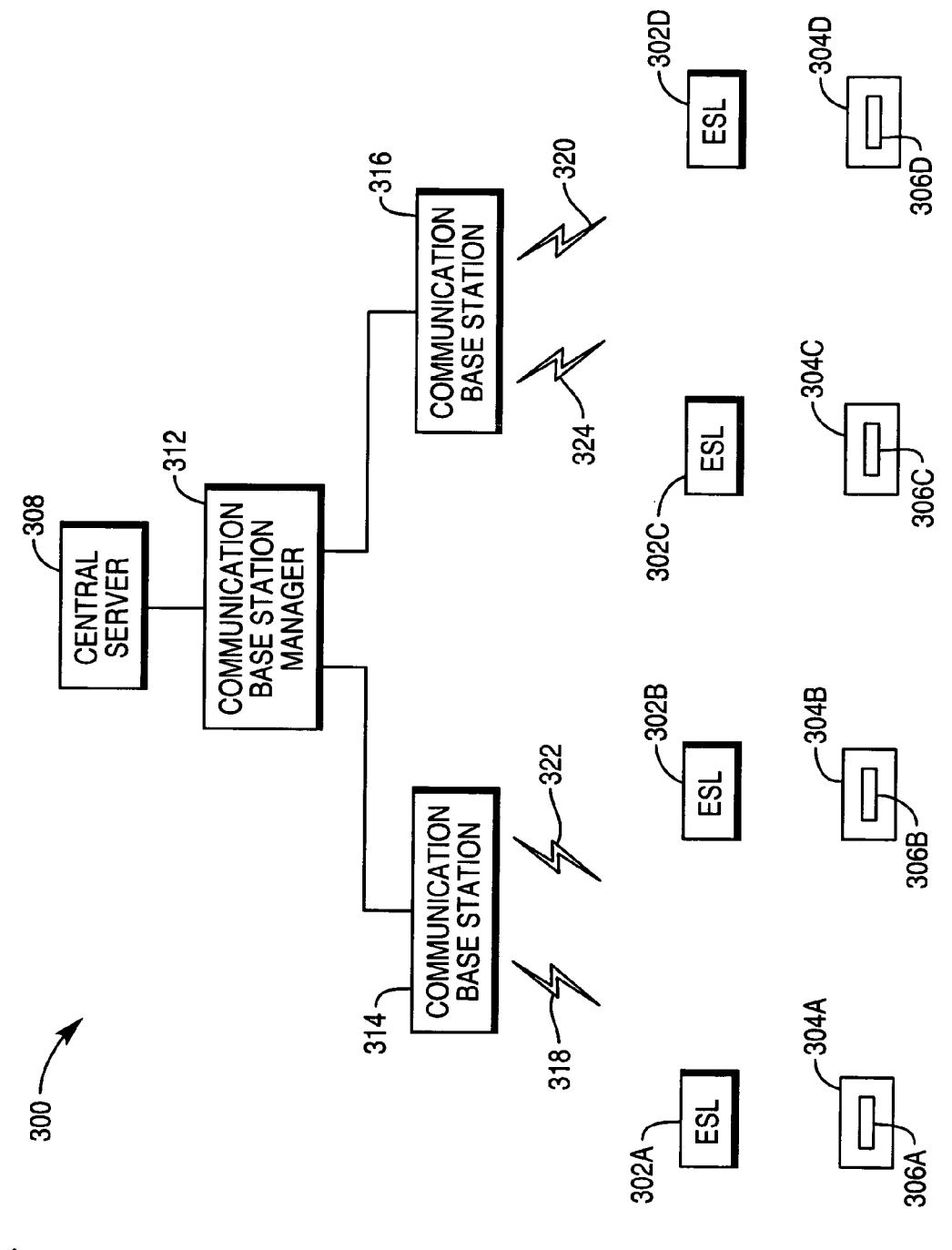
FIG. 3 illustrates an RFID and electronic shelf label system according to an aspect of the present invention.

FIG. 3 illustrates a system 300 for management of goods in a retail establishment according to an aspect of the present invention. The system 300 provides for display of pricing and other product information using electronic shelf labels (ESLs), as well as tracking of goods using high sensitivity RFID tags similar to the tag 100.

The system 300 includes a plurality of electronic shelf labels 302A-302D and a plurality of RFID tags 304A-304D, affixed to products 306A-306D. For simplicity, only four ESLs and four RFID tags are illustrated here, but it will be recognized that as many ESLs and RFID tags may be deployed as are desired and that a location may, and typically will, employ large numbers of ESLs and RFID tags.

The system 300 includes a central server 308, a communication base station manager 312 and a plurality of communication base stations 314 and 316. The central server 308 manages data and commands to be transmitted to and received from the ESLs 302A-302D and the RFID tags 304A-304D. For example, the central server 308 can prepare updates to ESL data and receive trouble reports from ESLs, and can receive and process RFID tag information. The communication base station manager 312 prepares and formats signals for transmission to the ESLs and the RFID tags and processes signals received from the ESLs and RFID tags. Communication is carried out through transmission of RF signals, transmitted and received by the communication base stations 314 and 316. In the embodiment shown, the communication base stations 314 and 316 serve as ESL communication base stations and as RFID readers, but it will be recognized that separate ESL communication base stations and RFID readers may be employed.

Typically, the communication base stations 314 and 316 transmit signals 318 and 320 to provide programming and messages to the ESLs 302A-302D. This information may include, for example, information used to update a display, or diagnostic interrogations. The ESLs 302A-302D typically respond to the signals 318 and 320 through modulated backscatter of the transmitted signals, for example to provide diagnostic information or an acknowledgement that a command has been received and acted upon. The communication base stations 314 and 316 transmit signals 322 and 324 to the RFID tags 304A-304D, which process and respond to the signals in a way similar to that described above in connection with FIGS. 1 and 2. The system 300 provides an integrated environment supporting both ESL and RFID communication.

Figure 4:
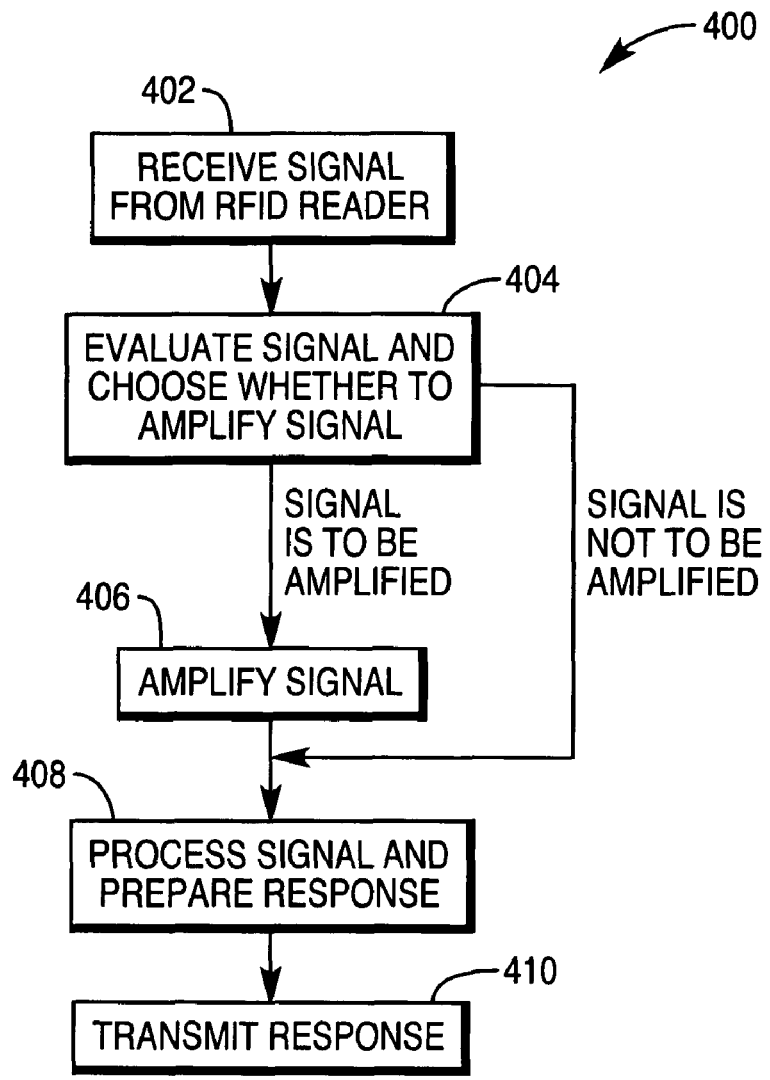
FIG. 4 illustrates a process of communicating with an RFID reader according to an aspect of the present invention.

FIG. 4 illustrates a process 400 of communication with an RFID reader according to an aspect of the present invention. At step 402, an RFID signal is received from an RFID reader. At step 404, the RFID signal is evaluated based on predetermined selections and a choice is made as to whether or not to amplify the RFID signal. For example, if a weak RFID signal is to be amplified, the RFID signal is evaluated to determine whether it is below a predetermined signal strength and the choice is made to amplify the signal if it is below the predetermined strength. To take another example, if all RFID signals are to be amplified, the choice is always made to amplify the signal. In any case, if the signal is to be amplified, the process proceeds to step 406; otherwise, the process skips to step 408. At step 406, the RFID signal is amplified to produce an amplified signal. The amplification is performed using power independent of the RFID signal, such as battery power or coupling to an external power source. The process then proceeds to step 408. At step 408, the RFID signal is processed and a response is prepared. For example, if the signal is an interrogation signal, a response is prepared providing identification information. At step 410, the response is transmitted.

FIG. 5 illustrates a process 500 of management and control of goods according to an aspect of the present invention. At step 502, a plurality of RFID readers is deployed throughout a location such as a store, warehouse or the like. The placement of readers may be suitably chosen such that at least one reader will be within the expected range of an RFID tag, no matter where the tag may be deployed within the location. At step 504, RFID tags are affixed to items to be distributed within the location. Each of the RFID tags preferably has a relatively high sensitivity achieved by amplifying RF signals received by the tag from a reader. The RFID tags may suitably be similar to the tag 100 of FIG. 1.

Before being affixed to an item, each tag may be programmed through suitable commands issued by an RFID reader or other suitable device. Depending on the design of the tag and the specific uses planned for the tag, commands may include commands determining when signal amplification is to be performed. For example, amplification may be performed continuously, when a weak but detectable signal is detected or when any signal is detected. Depending on the design of each tag, commands may set a tag's mode of operation permanently, or the settings may be temporary and changeable by subsequent commands. At step 506, items are distributed throughout the location as desired. At step 508, RF signals are emitted from each reader as desired. For example RF signals may be emitted continuously or alternatively may be emitted according to some predetermined pattern. At step 510, signals emitted by the tags are received and analyzed to obtain identification information for items associated with the tags. At step 512, item identification information obtained from the signals is used to retrieve item information, such as price information, product descriptions, inventory control information or the like. At optional step 514, new commands may be issued to selected tags as desired in order to change their mode of operation. For example, commands may be issued to change the conditions under which amplification of a signal is to be performed. At optional step 516, recharging of batteries of selected tags or all tags is performed, for example by bringing a tag within range of a field supplying power to recharge a tag's battery or by providing a field from each reader or from other devices sufficient to supply power to recharge batteries of tags within the field.

While the present invention is disclosed in the context of a presently preferred embodiment, it will be recognized that a wide variety of implementations may be employed by persons of ordinary skill in the art consistent with the above discussion and the claims which follow below.

I claim:

1. An at least partially self powered radiofrequency identification (RFID) tag for use in an RFID system, the RFID tag comprising:
    an antenna for receiving an RFID reader signal from an RFID reader, the RFID reader signal providing power for said RFID tag when the received RFID reader signal is sufficiently strong;
    an amplification circuit employing a power source independent of the RFID reader for amplifying the RFID reader signal which is active to produce an amplified signal in a first mode and inactive in a second mode;
    an amplifier control circuit for controlling operation of the amplification circuit whereby the amplification circuit is controlled to be active in the first mode if the received RFID reader signal has a level below a predetermined minimum; and
    a communication circuit for receiving the amplified signal and sending a response signal to the RFID reader based on the amplified signal in the first mode and for receiving the RFID reader signal and sending a response signal to the RFID reader based thereon in the second mode.

2. The RFID tag of claim 1, wherein the power source comprises a flexible battery to provide power to amplify the RFID signal.

3. The RFID tag of claim 2, wherein the battery is a flexible printable battery.

4. The RFID tag of claim 3, wherein the battery is incorporated into an antenna structure of the tag.

5. The RFID tag of claim 1, wherein the power source is an external power source and the tag includes an interface to the external power source to allow the amplification circuit to be powered by the external power source.

6. The RFID tag of claim 5, further including a rechargeable battery and wherein the interface to the external power source includes a coupling to the battery to allow the battery to be recharged by the external power source.

7. The RFID tag of claim 5, wherein the external power source may be an external light source, a magnetic field, an electrical field or mechanical motion or vibration and wherein the interface to the external power source may be a solar cell for receiving power from the external light source, a magnetic inductive coupling for receiving power from the magnetic field, a capacitive coupling for receiving power from the electrical field or a mechanical transducer for converting the mechanical motion or vibration into electrical power.

8. The RFD tag of claim 1, wherein the amplifier control circuit is operative to receive commands to change the conditions mode of operation of the amplification circuit.

9. The RFID tag of claim 8, wherein the amplifier control circuit is operative to receive commands through an inductive coupling interface.

10. The RFID tag of claim 8, wherein the amplifier control circuit is operative to receive commands through a capacitive coupling interface.

11. A method of radio frequency identification (RFID) communication, comprising the steps of:
   receiving an RFID signal from an RFID reader;
   determining whether the received RFID signal is below a predetermined minimum;
   utilizing power from the received RFID signal to prepare and transmit a response based on the received RFID signal in a first mode;
   amplifying the RFID signal to produce an amplified RFID signal, amplification being accomplished using a power source independent of the RFID signal in a second mode when the received RFID signal is below the predetermined minimum;
   preparing a response signal based on the amplified RFID signal; and
   transmitting the response signal to the RFID reader.

12. The method of claim 11, wherein the power source for amplifying the RFID signal is a flexible battery.

13. The method of claim 11, wherein the power source for amplifying the RFID signal is an external power source.

14. The method of claim 12, further comprising a step of coupling the battery to an external power source for recharging.

15. The method of claim 11, further comprising a step of specifying conditions under which amplification is to be performed.

16. The method of claim 15, wherein amplification is performed at all times an RFID signal is detected, when the RFID signal is below a predetermined strength, or at all times, depending on which conditions have been specified.

* * * * *